United States Patent [19]
Peterson et al.

[11] Patent Number: 5,937,334
[45] Date of Patent: Aug. 10, 1999

[54] RADIO COMMUNICATIONS AND TELEPHONE NETWORK INTERFACE SYSTEM

[75] Inventors: Fred Peterson, 1219 Tisch Rd., Jefferson, Ohio 44047; Bradley Albing, Macedonia, Ohio

[73] Assignee: Fred Peterson, Jefferson, Ohio

[21] Appl. No.: 08/724,515

[22] Filed: Sep. 30, 1996

[51] Int. Cl.[6] .................................................. H04M 11/00
[52] U.S. Cl. ...................... 455/74.1; 455/561; 379/442; 379/443
[58] Field of Search ........................... 455/74.1, 79, 462, 455/561, 555; 379/442, 443

[56] References Cited

U.S. PATENT DOCUMENTS

| | | |
|---|---|---|
| 3,234,333 | 2/1966 | Guder .......................................... 379/87 |
| 3,254,159 | 5/1966 | Condict ...................................... 379/353 |
| 3,696,320 | 10/1972 | Smith et al. .............................. 379/332 |
| 4,012,596 | 3/1977 | West, Jr. et al. ......................... 379/442 |
| 4,677,656 | 6/1987 | Burke et al. .............................. 455/403 |
| 4,815,128 | 3/1989 | Malek ........................................ 380/9 |
| 4,922,546 | 5/1990 | Takahaski et al. ........................ 455/74 |
| 4,956,876 | 9/1990 | Koshiishi ................................... 455/78 |
| 5,504,802 | 4/1996 | Kennedy et al. ........................ 455/427 |

*Primary Examiner*—Andrew M. Dolinar
*Attorney, Agent, or Firm*—Renner, Otto, Boisselle & Sklar, P.L.L.

[57] ABSTRACT

A phone patch 26 for interfacing between a radio 12 and a telephone network 32 includes means for electrically coupling audio signals between the radio 12 and the telephone network 32. A monitoring means is operationally coupled to the coupling means and may adjust the audio signals through operator controls 42. The monitoring means allows an operator to communicate with both the radio and telephone user and modify the audio signals to provide sufficient volume without overmodulation.

12 Claims, 3 Drawing Sheets

RADIO COMMUNICATIONS AND TELEPHONE NETWORK INTERFACE SYSTEM

FIELD OF THE INVENTION

The invention relates generally to communications interface systems, and more particularly to an interface system for radio communications and telephone networks.

BACKGROUND OF THE INVENTION

Often an individual having a two-way radio wishes to contact people who do not have access to a radio or are otherwise not able to communicate via radio. In response to this need, systems were developed to interface a two-way radio to a telephone network. Some prior art systems utilized acoustic coupling mechanisms to interface the audio signals, but suffered from poor quality communication between the radio and the telephone and reliability issues inherent in such electromechanical devices.

Prior art interface systems based on electrical coupling improved the signal quality of the communications. These prior art systems suffer, however, from a lack of flexibility in adjusting the audio signals to account for variations in the signal strengths or voice volumes of the calling and receiving parties, for example. Further, such interface systems do not provide an operator, who is facilitating the interface, with flexibility in communicating with the calling and receiving parties in the enabling of the call connection and the subsequent monitoring of the call.

In view of the aforementioned shortcomings associated with existing interface systems for interfacing radio communications on a telephone network, there is a strong need in the art for an interface system which provides for clear and reliable communications therebetween. Moreover, there is a strong need in the art for an interface system which allows for flexibility of a system operator in establishing, monitoring and controlling such an interface.

SUMMARY OF THE INVENTION

In one aspect of the invention, a phone patch for interfacing between a radio and a telephone network includes a means for electrically coupling audio signals between the radio and the telephone network and means for monitoring the audio signals. The monitoring means is operable to adjust the audio signals and may include an operator handset for monitoring the signals and communicating to the radio and a telephone in the telephone network. The monitoring means may also include an audio signal modification means to modify the amplitude of the audio signals through the phone patch.

In another aspect of the invention, a radio communications and telephone network interface system includes a base station having receiving and transmission means for radio and telephone signals. The base station converts the radio signals into audio signals and couples, monitors and modifies the audio signals. A radio, remote from the base station, transmits and receives radio signals to the base station and a telephone in a telephone network also transmits and receives telephone signals from the base station. The base station provides means for an operator to facilitate calls to the telephone network and provides monitoring and adjustment operability to provide quality communication between the communicating parties.

In yet another aspect of the invention, a method of interfacing between a radio communications device and a telephone network includes electrically coupling audio signals between the radio communications device and a telephone via the telephone network. The method also includes monitoring the audio signals which may include adjusting the amplitude of the audio signals, thereby improving the communication quality without overmodulation.

In another aspect of the invention, a method of interfacing radio communications and telephone communications includes receiving a signal which indicates a desired telephone destination address from a radio communications device. Communication is established with the telephone at the destination address and a communications link is created between the radio communications device and the telephone. The link is monitorable and adjustable, thereby providing audio signal detection and audio signal amplitude modification over the communications link.

To the accomplishment of the foregoing and related ends, the invention, then, comprises the features hereinafter fully described and particularly pointed out in the claims. The following description and the annexed drawings set forth in detail certain illustrative embodiments of the invention. These embodiments are indicative, however, of but a few of the various ways in which the principles of the invention may be employed. Other objects, advantages and novel features of the invention will become apparent from the following detailed description of the invention when considered in conjunction with the drawings.

DETAILED DESCRIPTION OF THE INVENTION

The invention relates to an interface system, also referred to herein as a phone patch, which serves as an interface between radio communications and a standard telephone network. A user of a two-way radio, for example a citizen band (CB) or ham radio, may be in an automobile or at some other remote location, and may wish to contact an individual not having access to a two-way radio or otherwise being able to communicate via radio. The invention allows a user to interface, via the radio, with a telephone network such as a standard land-based network or cellular network. The calling party utilizes the two-way radio to contact a radio base station which demodulates the radio signals into audio signals and electrically connects the audio signals to a phone patch of the present invention. An operator of the phone patch uses the phone patch to establish a telephone connection between the phone patch and the party the user wants to call. The phone patch electrically couples the audio signals, via the telephone network, to the party the user wants to call, i.e., the receiving party. Similarly, audio signals from the receiving party are received by the phone patch and are transferred to the radio base station for transmission to the user, i.e., the calling party. As is described more fully below, the phone patch allows an operator at the base station to converse with both the calling and called parties, monitor the call, and adjust the amplitude of the audio signals between the operator and the parties participating in the call, thereby providing suitable volume among the parties and preventing overmodulation and/or under modulation, for example.

Figure 1:
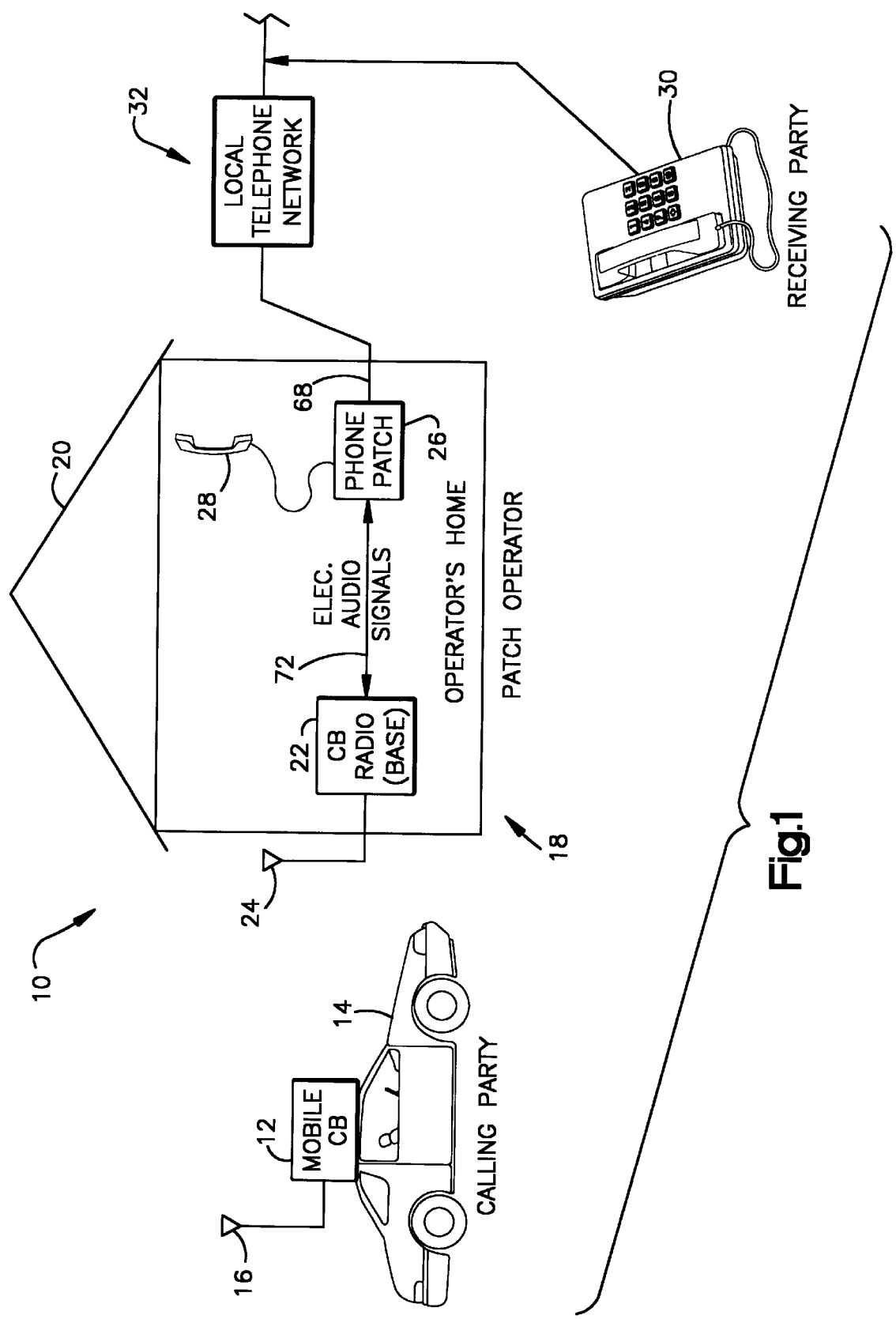
FIG. 1 is an environmental view of a radio communications and telephone network interface system in accordance with the present invention.

FIG. 1 is an environmental view of a communication system 10 which employs an interface system between radio communications and a telephone network in accordance with the present invention. The system 10, in one exemplary embodiment, includes a two-way CB mobile radio 12 within an automobile 14. The mobile radio 12 includes an antenna 16 for transmitting and receiving CB radio communications according to conventional techniques. For example, the mobile radio 12 communicates via the antenna 16 to a patch operator site 18 (which may be a patch operator's home 20) having a CB radio base station 22. The base station 22 includes an antenna 24 for transmitting and receiving signals with the mobile radio 12, for example. The base station 22 and mobile radio 12 are able to communicate with each other using well known, conventional techniques. As discussed more fully below, phone patch 26, having a handset 28, is connected between the base station 22 and a telephone network 32. The telephone network 32 includes a connection to the telephone 30 of the receiving party. Although a mobile radio 12 and base station radio 22 are used in this particular embodiment, any two-way radio link may be used and falls within the scope of this invention.

Within a CB radio environment, the calling party in the automobile 14 may contact a patch operator site 18, via the mobile radio 12 and the base station 22, and ask the operator who receives the radio communication to dial the number of a receiving party via the phone patch 26. The operator then dials the number of the called party and, upon making connection with the called party, the phone patch 26 electrically couples the radio transmission (converted into audio signals by the mobile radio base station 22) and the telephone transmission together via the phone patch 26. Once a connection is established between the calling and called parties, the operator may monitor the conversation between the parties using the phone patch 26. Such monitoring may be useful, for example, to know when to push a push-to-talk (PTT) button (not shown in FIG. 1) on the phone patch 26 to enable audio signals received from the called party (on the telephone 30) to be transmitted by the base station 22 to the calling party. Alternatively, in a radio environment which does not require PTT operation, the PTT function of the operator may be replaced by a voice-activated transmission (VOX) circuit which is triggered by audio signals from the receiving party. The operator is able to monitor and contribute to the conversation between the parties via the handset 28. Additionally, the operator may adjust the audio levels of all the audio signals using the phone patch 26. Each of these operations and capabilities will become even more apparent in view of the following description of FIGS. 2 and 3.

Figure 2:
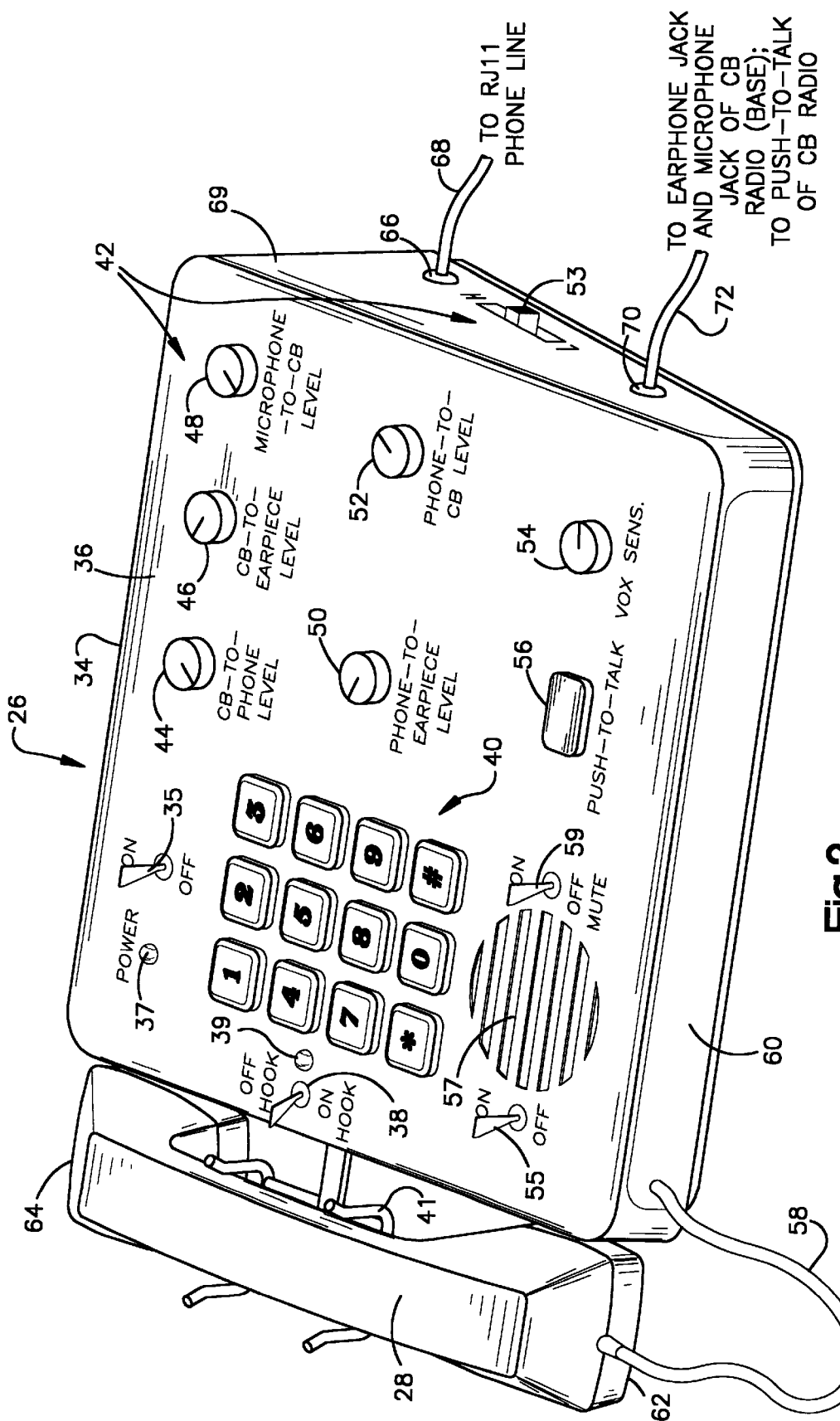
FIG. 2 is a perspective view of the interface system in accordance with the present invention.

FIG. 2 is a perspective diagram illustrating the phone patch 26 of FIG. 1. The phone patch 26 has a housing 34 having a top face 36 upon which a power switch 35 and power light 37 are contained. The power switch 35 allows an operator to turn the phone patch 26 off if desired. An on-hook/off-hook switch 38 and an on-hook/off-hook light 39 are also located on the top face 36 of the phone patch 26. The on-hook/off-hook switch 38 allows the operator to pick up the handset 28 to talk to a user of the radio 12 without the annoyance of a dialtone in the background, which typically accompanies the lifting of the handset 28 from its cradle 41, by switching the switch 38 to the off-hook position. In this manner, the phone patch 26 still operates as though the handset 28 is in the cradle 41 and therefore a telephone call can still be received from the telephone network 32. Further, when the switch 38 is in the off-hook position, the light, which may consist of an LED, turns on to indicate to the operator that the phone patch 26 is, in fact, "off-hook." Conversely, when the switch is in the on-hook position, an operator will experience a dialtone when lifting the handset 28 from the cradle 41 and a telephone user attempting to call the phone patch 26 at that moment will experience a busy signal.

Also on the housing 34 is a standard DTMF touch-tone phone pad 40 and a plurality of patch controls 42 including a radio-to-phone level control knob 44, a radio-to-earpiece level control knob 46, a microphone-to-radio level control knob 48, a phone-to-earpiece level control knob 50, a phone-to-radio level control knob 52, a microphone-to-phone control bar 53, a voice-activated transmission (VOX) control knob 54 and a push-to-talk (PTT) button 56. A speakerphone switch 55 allows a user to switch between a standard handset use option or a speakerphone option which leaves the operator's hands free for other tasks. A speaker 57 is also located on the top face 36 and reproduces audio signals to the operator if activated by the speakerphone switch 55. A mute switch 59 also resides on the top face 36 and allows an operator to mute a conversation being held with a recipient on the telephone 30 so that no one on the radio will hear the conversation between the phone patch 26 and the telephone 30.

A handset connector cable 58 is coupled to the phone patch 26 through a front portion 60 and connects to the handset 28 having a microphone 62 and an earpiece 64 located therein to the circuitry within the phone patch 26 as discussed further below. The handset 28 is similar in construction to a handset of a standard telephone. The phone patch 26 also has an RJ-11 connector 66 for receiving one end of a phone line 68, with the other end of the phone line 68 connected to a standard telephone network 32 via a telephone wall jack, for example. The phone patch 26 further includes a radio communication connector 70 for receiving one end of a cable 72. The other end of the cable 72 is connected to the microphone input/earphone output of the base station 22. The phone line 68 carries audio signals to and from the telephone network 32 while the cable 72 carries audio signals to and from the base station 22 as will be appreciated.

The phone patch 26 allows an operator to monitor a call and adjust the volume of the various audio signals to provide volume control, thereby providing sufficient audio volume between the calling and receiving parties without overmodulation. In an exemplary mode of operation, the user with the mobile radio 12 will control the operator at the base station 22 via radio transmission. The user will identify to the operator the telephone number of the party the user wishes to call. While maintaining a radio link with the user, the operator dials the telephone number specified by the user via the touch-tone phone pad 40. Upon contacting the called party (the receiving party) via the telephone network 32, the phone patch 26 serves to electrically couple the audio signals from the user to the receiving party, and vice versa. The operator may monitor the call via the earpiece 64 of the handset 28. The operator may also speak with either party via the microphone 62 and may modify the amplitude (volume) of all the audio signals via the patch controls 42. The patch controls 42 allow the operator to adjust the audio signal levels of the receiving party, the patch operator, and the calling party to achieve suitable audio levels so that optimum communication quality is achieved. Alternatively, the operator may monitor the call and converse with the parties via a speaker and microphone (not shown) located under the speaker aperture 57, thereby using the phone patch 26 like a speakerphone.

The voice-activated transmission (VOX) control 54 and the push-to-talk (PTT) button 56 may be used depending upon the type of mobile radio 12 involved in the call. As is well known with CB radios, to transmit a signal one must push the PTT button 56. Therefore when the party using the telephone 30 wishes to speak to the calling party with the mobile radio 12, the operator must push the PTT button 56 to effectuate transmission from the telephone 30 to the radio 12. In a non-CB radio environment, the voice-activated transmission (VOX) control 54 allows the operator to alter the sensitivity of a VOX circuit within the phone patch 26 (not shown in FIG. 2). In this manner, the operator can increase or decrease the sensitivity of the VOX circuit to account for the volume of a user's voice on the telephone 30 and for background noise that may exist on the telephone 30.

Figure 3:
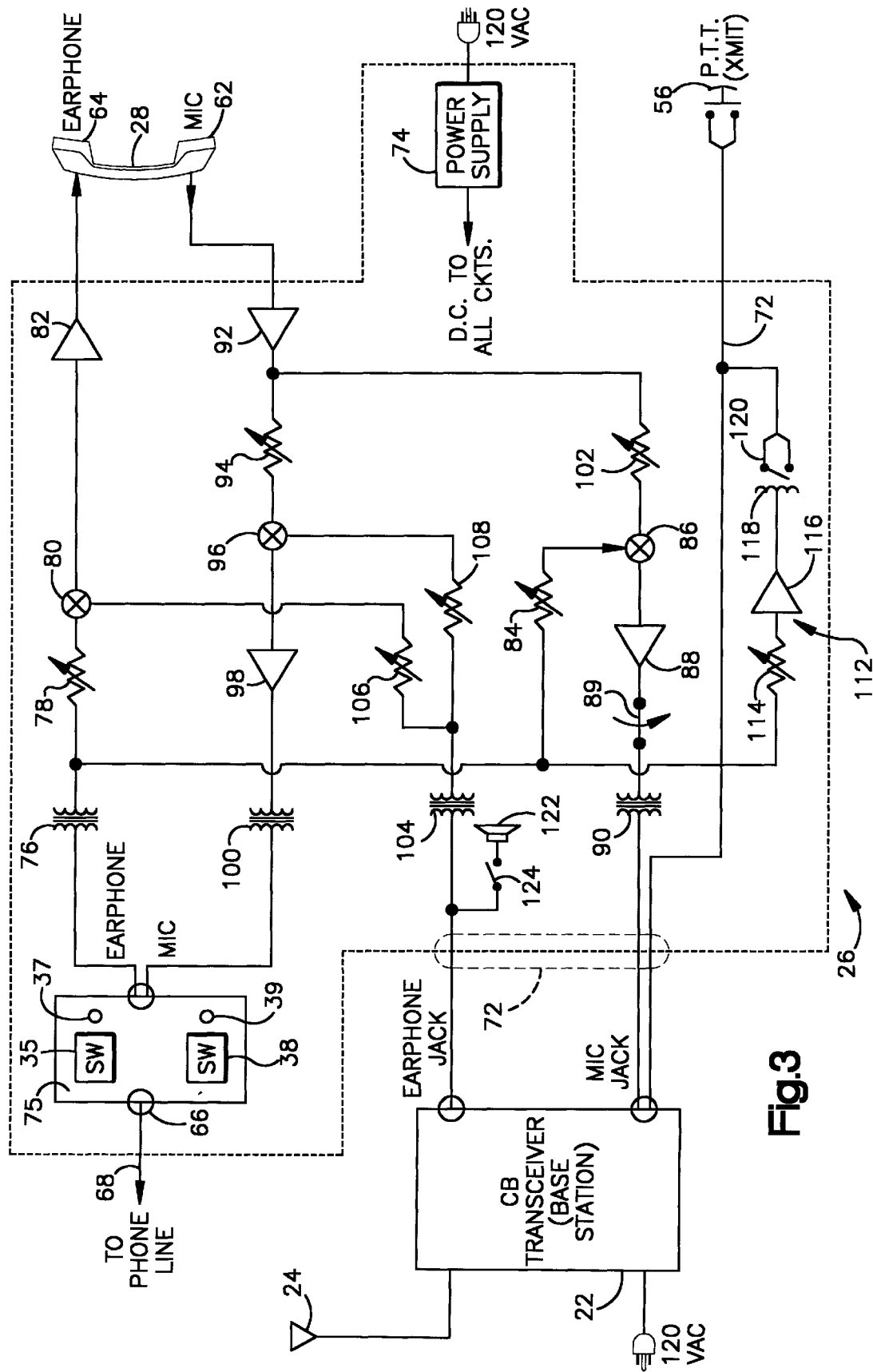
FIG. 3 is a schematic diagram of the interface system in accordance with the present invention.

FIG. 3 is a schematic diagram of the phone patch 26 coupled between the base station 22 and the standard telephone network 32 via line 68. The phone patch 26 contains a power supply circuit 74 which takes a 120 volt AC input signal and converts it to one or more DC voltages to provide power to all the circuit components within the phone patch. The phone patch 26 includes a telephone circuit board 75 which is a standard desk set telephone circuit board which interfaces the audio signals between an RJ-11 and an RJ-22 connector and provides standard telephone functions. The circuit board 75 contains standard phone circuits such as a key pad interface (which is coupled to the key pad 40 of FIG. 2), dial circuits, memory, ringing detector circuitry, ring generator circuits, surge protection circuitry as well as the power switch 35, power light 37, on-hook/off-hook switch 38 and light 39. A patch operator may use the telephone circuit board 75 in conjunction with the handset 28 to make calls out to a receiving party as well as receive calls from the telephone network 32.

A signal, via the phone line 68, passes through the telephone circuit board 75 to a first isolation transformer 76 which acts to provide audio signal protection from RF bleeding and signal noise and thereby provide high quality audio signals. The isolation transformer 76 is also provided to comply with Part 68 of the FCC regulations. The signal passes through the first isolation transformer 76 to a first potentiometer 78 which has its resistance control coupled to the phone-to-earpiece level control knob 50 of FIG. 2. Manual adjustment of the control knob 50 alters the resistance of the first potentiometer 78 which acts as an adjustable voltage divider network to increase or decrease the level (and therefore the volume) of the audio signal from the telephone 30 to the earpiece 64 of the operator handset 28. In this manner, the operator may adjust the volume of the audio signals received from the telephone 30.

The audio signal passes through the first potentiometer 78 and goes to a first summer 80, which adds the signal to an audio signal from the radio 12 (which will be discussed later), and outputs a summation signal to a first buffer 82. The first buffer 82 is a unity gain amplifier that provides signal conditioning for the summed audio signal which is output to the earpiece 64 of the operator handset 28.

The signal from the telephone 30 also travels through the telephone circuit board 75 and first isolation transformer 76 to a second potentiometer 84. The second potentiometer 84 has its resistance control connected to the phone-to-radio level control knob 52 of FIG. 2. Manual adjustment of the control knob 52 alters the resistance of the second potentiometer 84, thereby increasing or decreasing the level of the audio signal from the telephone 30 to the mobile radio 12 via the mobile radio base station 22. In this manner, the operator may modify the volume of the audio signals from the telephone 30 to the radio 12.

The adjusted audio signal is input to a second summer 86 which adds the adjusted audio signal from the telephone 30 to another audio signal from the operator handset 28 (which will be described later) and outputs a summation signal to a second buffer 88 which provides signal conditioning. The summation signal also goes through a second isolation transformer 90 which, like the first isolation transformer 76, provides signal protection from RF bleeding and signal noise. The signal passes through the second isolation transformer 90 to the microphone jack of the mobile radio base station 22 via the cable 72.

The operator, via the handset 28, transmits audio signals from the microphone 62 to the calling and receiving parties through two paths. The audio signals travel in one path through a third buffer 92, which provides signal conditioning, to a third potentiometer 94. The third potentiometer 94 has its resistance control connected to the microphone-to-phone control bar 53 which is located on the side portion 69 of the housing 34 of FIG. 2. Manual adjustment of the control bar 53 alters the resistance of the third potentiometer 94 and increases or decreases the level of audio signals from the microphone 62 of the operator handset 28 to the telephone 30. In this manner, the operator may modify the volume of his or her audio signals to the telephone 30. The adjusted audio signal enters a third summer 96 which adds the adjusted audio signal to an audio signal from the radio 12. The third summer 96 outputs a summation signal to a fourth buffer 98 which provides signal conditioning and then travels through a third isolation transformer 100 which provides the same functionality as the first and second isolation transformers 76 and 90. The summation signal exits the third isolation transformer 100 and enters the telephone circuit board 75 for communication to the telephone 30.

The second path from the operator microphone 62 travels through the third buffer 92 to a fourth potentiometer 102. The fourth potentiometer 102 has its resistance control connected to the microphone-to-radio level control knob 48 of FIG. 2. Manual adjustment of the control knob 48 increases or decreases the level of audio signals from the microphone 62 of the operator handset 28 to the mobile radio base station 22 (for ultimate transmission to the radio 12). In this manner, the operator may modify the volume of his or her audio signals to the radio 12. The adjusted audio signal enters the second summer 86 and is added to the audio signal from the telephone 30. The summation signal passes through the second buffer 88, a mute switch 89, and the second isolation transformer 90 to the mobile radio base station 22 for communication to the radio 12. The mute switch 89 is electrically connected to the mute switch 59 of FIG. 2. When opened, the mute switch 89 mutes audio signals from the operator to the radio 12.

Audio signals are transmitted from the mobile radio 12 to the operator and the telephone 30 in the following manner. The mobile radio base station 22 sends audio signals from the radio 12 through a fourth isolation transformer 104 to a fifth potentiometer 106. The fifth potentiometer 106 has its resistance control connected to the radio-to-earpiece level control knob 46 of FIG. 2. Manual adjustment of the control knob 46 increases or decreases the audio signal level from the mobile radio 12 to the earpiece 64 of the handset 28. In this manner, the operator may modify the volume of the audio signals received from the radio 12. The adjusted audio signal is an input to the first summer 80 where it is added with the audio signal coming from the telephone 30. The output summation signal is conditioned by the first buffer 82 and arrives at the earpiece 64 of the handset 28.

The audio signal from the mobile radio 12 also exits the fourth isolation transformer 104 and goes to a sixth potentiometer 108 which has its resistance control connected to the radio-to-phone level control knob 44 of FIG. 2. Manual adjustment of the control knob 44 increases or decreases the audio signal from the mobile radio 12 to the telephone 30. In this manner, the operator may adjust the volume of the audio signals from the radio 12 to the telephone 30. The adjusted audio signal then forms an input to the third summer 96 which adds the adjusted signal to an audio signal from the operator and sends its summation to the telephone 30 via the fourth buffer 98 and the third isolation transformer 100.

A voice-activated transmission (VOX) circuit 112 is coupled between the mobile radio base station 22 and the telephone 30 via the telephone circuit board 110. The VOX circuit 112 includes a VOX potentiometer 114 coupled to a VOX buffer 116 which in turn is coupled to a coil 118 for driving a relay 120. In a non-CB radio application, an audio signal from the telephone 30 will travel through the telephone circuit board 75 and the first isolation transformer 76 to energize the coil 118, thereby closing the relay 120 to provide a transmission-enabling function for the mobile radio base station 22. The VOX potentiometer 114 is also coupled to the VOX control knob 54 of FIG. 2. Manual adjustment of the VOX control knob 54 by the operator alters the sensitivity of the VOX circuit 112 since a minimum threshold is required to sufficiently energize the coil 118 to close the relay 120. Therefore by adjusting the VOX potentiometer 114, the audio signal level at the VOX buffer 116 is altered. In this manner, the operator may modify the sensitivity of the VOX circuit 112 to account for the speaking volume of one using the telephone 30 and for background noise on the telephone 30.

A speaker 122 may also be connected via a switch 124 to communicate the audio signals from the mobile radio base set 22 to the operator in a speakerphone-type format instead of via the earpiece 64 of the handset 28. With this alternative embodiment, the microphone 62 may also be physically located in the housing 34 of FIG. 2, thereby allowing the operator's hands to be free.

The phone patch 26 of FIG. 3 operates functionally as follows. When a mobile radio user wishes to make a call, he contacts the patch operator via the mobile radio base station 22. The audio signal goes through the fourth isolation transformer 104, the fifth potentiometer 106, the first summer 80, and the first buffer 82 to the earpiece 64 of the operator handset 28. Alternatively, the operator may hear the audio signal over the speaker 122. The operator may adjust the volume of the caller's audio level via the radio-to-earpiece control knob 46 which alters the resistance of the fifth potentiometer 106.

The caller communicates the phone number of the desired receiving party to the operator who then dials the phone number via the key pad 40 and telephone circuit board 75. The operator makes contact with the receiving party on the telephone 30, via the phone patch 26, and audio signals are received from the telephone 30 via the telephone circuit board 75, the first isolation transformer 76, the first potentiometer 78, the first summer 80, and the first buffer 82. The operator may adjust the audio signal through the manual adjustment of phone-to-earpiece level control knob 50 which is coupled to the first potentiometer 78.

The operator, after completing initiation of the call, may continue to monitor and participate in the call via the handset 28. Further, the operator may adjust the audio signal levels of all the parties participating in the call. For example, the audio signal from the mobile radio 12 to the telephone 30 travels through the fourth isolation transformer 104, the sixth potentiometer 108, the third summer 96, the fourth buffer 98, and the third isolation transformer 100. The operator may adjust the audio level of this signal through manual adjustment of the radio-to-phone level control knob 44 which alters the resistance of the sixth potentiometer 108. In this manner, sufficient volume is maintained while simultaneously eliminating overmodulation or undermodulation.

In another alternative embodiment, the mobile radio base station 22 and the phone patch 26 of FIG. 1 may be integrated together into a single unit, thereby decreasing the cost and the complexity of the system for set-up.

In yet another alternative embodiment, a display may be added to the phone patch 26 to display the available channels on the two-way radio 12. The display may include a channel designator and a light next to each channel designator to indicate which channels are active and which are inactive.

Although the invention has been shown and described with respect to certain preferred embodiments, it is obvious that equivalents and modifications will occur to others skilled in the art upon the reading and understanding of the specification. The present invention includes all such equivalents and modifications, and is limited only by the scope of the following claims.

What is claimed is:

1. A phone patch for interfacing between a radio communications device and a telephone network, comprising:

means for electrically coupling audio signals between the radio communications device and the telephone network; and means for monitoring the audio signals through the phone patch, wherein the monitoring means comprises:

an operator handset for monitoring the audio signals through the phone patch; and audio signal modification means coupled to the operator handset and operable to modify the audio signals through the phone patch.

2. The phone patch of claim 1, wherein the audio signal modification means comprises a radio-to-phone audio signal amplitude control circuit operable to control the volume of an audio signal received from the radio communications device which is being coupled to the telephone network.

3. The phone patch of claim 1, wherein the audio signal modification means comprises a radio-to-handset audio signal amplitude control circuit operable to control the volume of an audio signal received from the radio communications device which is being coupled to the operator handset.

4. The phone patch of claim 1, wherein the audio signal modification means comprises a handset-to-radio audio signal amplitude control circuit operable to control the volume of an audio signal received from the operator handset which is being coupled to the radio communications device.

5. The phone patch of claim 1, wherein the audio signal modification means comprises a phone-to-handset audio signal amplitude control circuit operable to control the volume of an audio signal received from the telephone network which is being coupled to the operator handset.

6. The phone patch of claim 1, wherein the audio signal modification means comprises a phone-to-radio audio signal amplitude control circuit operable to control the volume of an audio signal received from the telephone network which is being coupled to the radio communications device.

7. The phone patch of claim 1, wherein the audio signal modification means comprises a handset-to-phone audio signal amplitude control circuit operable to control the volume of an audio signal received from the operator handset which is being coupled to the telephone network.

8. The phone patch of claim 1, wherein the operator handset comprises:

an earpiece coupled to the audio signal modification means for receiving audio signals from the radio communications device and the telephone network; and a microphone coupled to the electrical coupling means for transmitting audio signals from an operator to either the radio communications device or the telephone network.

9. The phone patch of claim 1, further including a power switch which allows an operator to turn the phone patch on and off.

10. The phone patch of claim 1, further including an on-hook/off-hook switch associated with the coupling means and monitoring means which allows an operator in an off-hook mode to utilize the handset to talk with a user of the radio communications device without experiencing a dial-tone while simultaneously being able to receive a call from the telephone network and allows the operator in an on-hook mode to place a call via the telephone network.

11. The phone patch of claim 1, further including a speakerphone switch associated with the coupling means and monitoring means which allows an operator to monitor and deliver audio signals through the phone patch without using the handset.

12. The phone patch of claim 1, further including a mute switch associated with the coupling means and the monitoring means which allows an operator to mute background noise while permitting a conversation between a party from the telephone network and a party on the radio communications device.

* * * * *